United States Patent
Hartman et al.

[15] 3,674,052
[45] July 4, 1972

[54] BALL VALVE

[72] Inventors: Leonard Hartman, Maplewood; Joseph Sciuto, Jr., Crestwood, both of Mo.

[73] Assignee: Stile-Craft Manufacturers, Inc., St. Louis, Mo.

[22] Filed: Jan. 12, 1970

[21] Appl. No.: 2,099

[52] U.S. Cl. ........................................137/625.21, 251/315
[51] Int. Cl. .................................................F16k 11/02
[58] Field of Search..................251/148, 152, 315, 317, 209; 137/625.21–625.24

[56] References Cited

UNITED STATES PATENTS

| 3,371,907 | 3/1968 | Scaramucci | 251/315 X |
| 3,437,106 | 4/1969 | Mueller et al. | 251/315 X |
| 3,056,418 | 10/1962 | Adams et al. | 251/315 X |
| 3,167,086 | 1/1965 | Michalski | 251/317 X |
| 3,354,904 | 11/1967 | Federle et al. | 251/209 X |
| 3,409,268 | 11/1968 | Gachot | 251/148 |
| 3,464,449 | 9/1969 | Morton | 137/625.24 |

*Primary Examiner*—Henry T. Klinksiek
*Attorney*—Cohn and Powell

[57] ABSTRACT

The valve includes a housing having aligned inlet and outlet ports intercommunicating by means of a central conduit passing through a rotatable ball mounted in the housing. The central conduit permits fluid flow through the valve when the valve is in the open position. When the ball is rotated to a closed position a second conduit, provided on the surface of the rotatable ball, communicates between the outlet port and an exit orifice in the interior of the housing. The second conduit permits bleeding of the downstream hydraulic system. The ball is seated on sealing washers and rotated by means of a key which is journaled through the housing and into engagement with the ball. The key includes a handle cooperating with stops on the housing to indicate open and closed valve positions.

1 Claim, 5 Drawing Figures

PATENTED JUL 4 1972
3,674,052
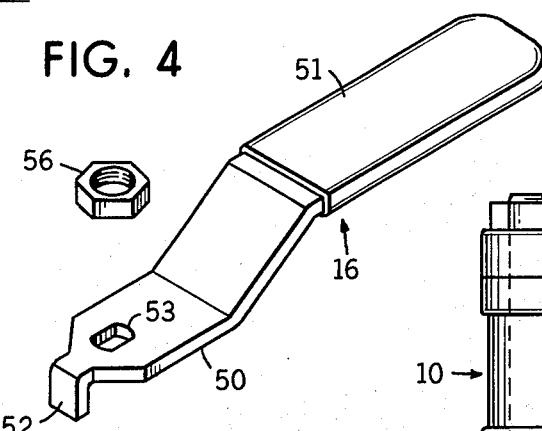
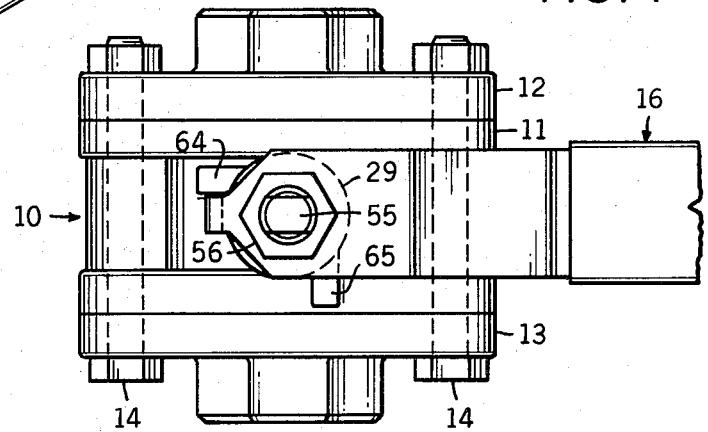
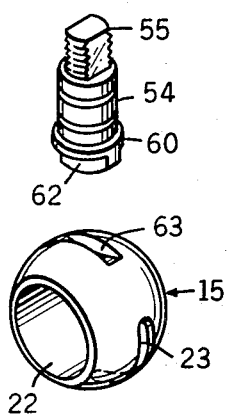
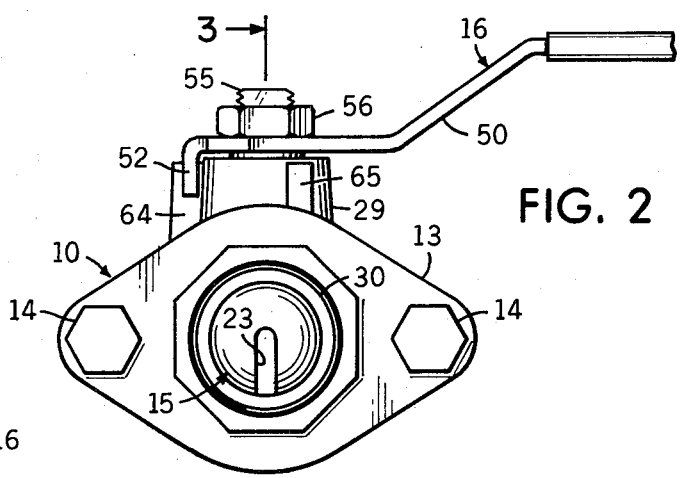
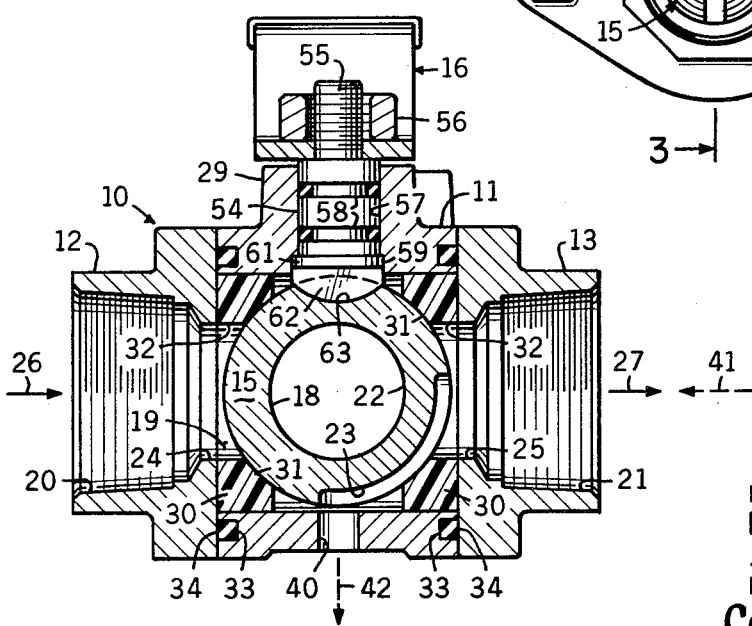
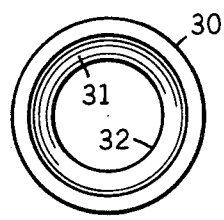
INVENTORS
LEONARD HARTMANN
JOSEPH SCIUTO, JR.
BY
Cohn and Powell
ATTORNEYS 3,674,052

BALL VALVE

BACKGROUND OF THE INVENTION

This invention relates in general to a ball valve and in particular to a cutoff valve having a branch line connection.

Ball valves are commonly used to provide an efficient means of cutting off main line flow in hydraulic systems and this type of valve is particularly valuable in situations which require that cutoff be virtually instantaneous as opposed, for example, to the much slower action of the common gate valve.

A problem which occurs in hydraulic systems utilizing cutoff valves, particularly fast acting valves, is that the hydraulic system downstream of the valve remains under pressure after cutoff resulting in a locked-up downstream system. This disadvantage is particularly apparent when the locked-up system includes a hydraulic cylinder, because it is usually desirable to relieve pressure on one side of such a hydraulic cylinder to permit the piston to travel freely to a convenient position. It frequently becomes necessary in such circumstances to provide an auxiliary bleed valve in the system.

Because of the ease and rapidity with which rotatable ball valves may be used, such a valve incorporating a simple three-way flow potential is highly desirable. This combination, however, is not readily available in the known art.

SUMMARY OF THE INVENTION

This rotatable ball valve provides a quick cutoff means without producing a locked-up system downstream of the valve. Thus, downstream moving parts, such as pistons, may be freely relocated. The valve permits direct bleeding of the system and the bleed orifice may be utilized to provide a three-way valve.

The valve includes a body having a valve chamber, inlet and outlet ports which communicate with the chamber, and an orifice also communicating with the chamber. A rotatable valve element is disposed within the chamber and this element includes a first conduit operatively communicating between the inlet and outlet ports in a first position and a second transverse conduit communicating between one of said ports and the orifice in a second position.

A seal provides a seating between the valve element and the body and actuating means are provided to rotate the valve element between the first and second positions. The rotatable valve element has a ball configuration.

The inlet and outlet ports are in substantial axial alignment and define a flow axis, the first conduit of the rotatable ball being in substantially axial alignment with the flow axis in the first position and in substantially perpendicular alignment with the flow axis in the second position. The second conduit of the rotatable ball includes an arcuate groove in the surface of the ball. The orifice provides a bleed hole and the arcuate groove extends between one of the ports and the bleed hole in the second position.

The actuating means include a rotatable key engaging and rotating the ball. The key includes a handle portion having a lip and the body is provided with angularly related stop portions engageable by the lip to limit rotation of the key between the first and second positions. The handle is aligned with the axis of flow in the first position and transversely disposed of the axis of flow in the second, bleed, position.

The body includes an intermediate portion and flanking end portions detachably connected thereto. The intermediate portion includes the bleed aperture.

BRIEF DESCRIPTION OF THE DRAWING:

FIG. 1 is a plan view on the valve in the cutoff position.
FIG. 2 is an end elevational view;
FIG. 3 is a sectional elevational view taken on 3—3 of FIG. 2;
FIG. 4 is an exploded view of the actuating mechanism, and
FIG. 5 is an elevational view of the sealing washer.

DESCRIPTION OF THE PREFERRED EMBODIMENT

Referring now by characters of reference to the drawing and first to FIG. 1 and 2, it will be understood that the ball valve includes a housing 10 constituting a body. The housing 10 includes an intermediate portion 11 and end portions 12 and 13, flanking the intermediate portion 11 and being detachably attached thereto by a pair of fasteners 14 extending between the body portions. A rotatable ball 15 is disposed within the interior chamber 19 of the housing 10, said ball 15 being rotatable by means of a key, generally shown by numeral 16, which engages the ball 15 and constitutes an actuating means.

The relative disposition of valve parts is clearly revealed in FIGS. 3 and 4 and it will be observed from FIG. 3 that each of the end portions 12 and 13 includes bored holes 20 and 21 respectively, constituting inlet and outlet ports. Each of the ports 20 and 21 is internally threaded to suit compatibly threaded hydraulic piping (not shown) in the hydraulic system of which the valve forms a part.

The ball 15 includes a central aperture 22 defined by a surrounding wall 18 and constituting a first conduit. An arcuate groove 23 constituting a second conduit is disposed in the wall 18. It will be observed that the inlet and outlet ports 20 and 21 are stepped and that each of these ports communicates with the interior of the intermediate portion 11 of the housing 10. The reduced diameter step portions 24 and 25 are in substantially axial alignment and define a central flow axis indicated by the arrows 26 and 27. The diameter of the central aperture 22 and the diameters stepped portions 24 and 25 are substantially equal and when the ball valve is in its open position these openings are in register. A pair of washers 30 of TEFLON or other suitable material provides a seal means between the rotatable ball 15 and the housing 10. It will be observed from FIG. 3 that the inner margin 31 of each washer 30 has an arcuate configuration conforming to the diameter of the ball 15 thus effectuating a seal between the rotatable ball 15 and the housing 10 and providing a seating for the ball 15 which insures a minimum of frictional resistance to rotation. The intermediate portion 11 of the housing 10 includes opposed annular grooves 34 which accommodate O-rings 34, which like the washer 30, are of TEFLON or similar material. It will be understood that these O-rings provide a seal between the intermediate portion 11 and the end portions 12 and 13 of the housing 10, the grooves 34 having a depth slightly less than the diameter of the O-ring to effectuate this sealing.

The arcuate groove 23 is disposed substantially at right angles to the central aperture 22. Thus, when the rotatable ball 15 is oriented to its cutoff position, as indicated in FIG. 3, and the inlet aperture 20 is thereby presented with a sealed imperforate face of the ball 15, flow through the valve in the direction of the main flow axis 26 is precluded. The arcuate groove 23 provides a communicating conduit between the outlet port 21 and the orifice 40 located in the bottom of the housing 10. Arrows 41 and 42, shown in broken outline, indicate the path of flow between the outlet port 21 and the orifice 40.

The mechanism by which the ball 15 is rotated is clearly illustrated in FIG. 4. This mechanism or actuating means comprises essentially a key 16 which includes a handle 50 cranked to provide a handhold portion 51 which is preferably covered with plastic. The handle 50 includes a downwardly depending lip 52 and a slot-shaped hole 53 which receives the compatibly shaped end 55 of a rotatable shaft 54. The shaft end 55 is threaded to receive a nut 56 whereby the handle 50 and the transverse shaft 54 are secured together to form, effectively, a single key unit. It will be observed from FIG. 3 that the intermediate portion 11 of the housing 10 includes a hub 29 having a central aperture 57 receiving the key shaft 54 in rotatable relation. The shaft 54 is grooved to accommodate a pair of O-rings 58 of rubber or other suitable sealing material. At its remove end the shaft 54 includes a head 60 providing an annular shoulder 61. The hub aperture 57 includes a socketed portion 59 receiving the annular shoulder 61 and precluding outward movement of the key shaft 54. Importantly, the head 60 includes a projecting arcuately configurated plug 62 constituting a shoulder a shoulder portion which engages a compatibly configurated groove 63 provided in the rotatable ball 15, the groove 63 constituting an abutment portion engageable by said shoulder portion. The ball 15 may be rotated by simply turning the handle 50.

It will be observed from FIGS. 1 and 2 that the intermediate portion 11 of the housing 10 includes right angularly disposed stop elements 64 and 65 which are engageable by the depending lip 52 of the handle 50 to limit rotation of the key 16 and define the valve cutoff and valve open positions.

It is thought that the structural features and functional advantages of this ball valve have become fully apparent from the foregoing description of parts, but for completeness of disclosure the installation and operation of the device will be briefly described.

The assembly of the valve is commenced by installing the key shaft 54 into the hub aperture 57 from the interior of chamber 19 of the housing 10. During installation the key shaft 54 must be oriented as indicated in FIG. 3 because of the structural arrangement of the engaging shaft plug 62 and the compatible groove 63 of the ball 15. In effect, the ball 15 is rolled into position within the substantially cylindrical housing chamber 19, which has a diameter slightly greater than the diameter of the ball 15. The sealing washers 30, which are a push fit within the chamber 19, are disposed on either side of the ball 15 and the end portions 12 and 13 of the housing 10 secured to the intermediate portion 11 by fasteners 14. Thus sealingly mounted within the interior chamber 19 of the housing 10 the ball 15 is conditioned for rotation.

After the handle 50 has been attached to the key shaft 54 rotation of the ball 15 is effectuated by turning said handle 50. The stop 64, which is oriented perpendicularly to the principal flow axis 26, and the stop 65, which is oriented in a direction parallel to the said flow axis are engaged by the depending lip 52 on the elongate handle 50. When the handle 50 is rotated into alignment with the principal flow axis 26 the central aperture 22 of the ball 15 is in alignment with the inlet and outlet ports 20 and 21 and the valve is in a first, open, position. When the handle 50 is disposed transversely to the flow axis 26 the ball valve wall 18 blocks flow between the inlet and outlet ports 20 and 21 and the valve is in a second, closed, position. Thus, the stop elements 64 and 65 provide a limit means between open and closed valve positions. In the second, closed position the arcuate groove 23 communicates between the outlet port 21 and the orifice 40 in the bottom of the housing 10. Thus, although the main flow is cut off, back flow through the outlet port 21 to the orifice 40 is possible and fluid in the downstream portion of the system may be bled through this orifice 40. It will be understood that this fluid flow, indicated by arrows 41 and 42, may be directed to a remote point by means of auxiliary piping (not shown) connected to said orifice 40. Alternatively, a stop cock may be utilized to provide selective restriction of the flow. Further, the ball valve arrangement outlined above lends itself readily for use as a three-way valve by utilization of the bleed orifice 40 as an exit port.

We claim as our invention:
1. A ball valve comprising:
   a. a body including a valve chamber, inlet and outlet ports communicating with the chamber and an orifice communicating with the chamber.
   b. a rotatable ball disposed within the valve chamber, the ball including:
      1. wall means defining a first conduit communicating with inlet and outlet ports in first position.
      2. a second conduit disposed in the wall means below the arcuate peripheral surface of the ball and providing a narrow opening in the peripheral surface in transverse relation to the first conduit, the second conduit communicating between one of said ports and the orifice in a second position,
   c. seal means between the rotatable ball and the body, and
   d. actuating means rotating the ball between first and second positions,
   e. the narrow opening being laterally spaced from the seal means in the said second position so that the narrow opening is open for almost all of the rotative movement of the ball, the narrow opening and seal means providing a substantially constant cross sectional flow area, the seal means engaging the arcuate peripheral surface of the ball and cooperating with the narrow opening of the second conduit to provide the substantially constant cross sectional flow area therethrough for almost all of the rotative movement of the ball and with a sharp cut-off only at the said first position.

* * * * *